United States Patent
Mukherjee et al.

(10) Patent No.: US 7,343,582 B2
(45) Date of Patent: Mar. 11, 2008

(54) OPTICAL PROXIMITY CORRECTION USING PROGRESSIVELY SMOOTHED MASK SHAPES

(75) Inventors: Maharaj Mukherjee, Wappingers Falls, NY (US); Scott M. Mansfield, Hopewell Junction, NY (US); Alan E. Rosenbluth, Yorktown Heights, NY (US); Kafai Lai, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 11/138,172

(22) Filed: May 26, 2005

(65) Prior Publication Data

US 2006/0271905 A1    Nov. 30, 2006

(51) Int. Cl.
*G06F 17/50* (2006.01)
(52) U.S. Cl. .......................................... 716/19; 716/4
(58) Field of Classification Search ..................... None
See application file for complete search history.

(56) References Cited

U.S. PATENT DOCUMENTS

| | | | |
|---|---|---|---|
| 6,857,109 B2* | 2/2005 | Lippincott | 716/2 |
| 7,043,712 B2* | 5/2006 | Mukherjee et al. | 716/19 |
| 7,260,814 B2* | 8/2007 | Rodin et al. | 716/21 |
| 7,261,981 B2* | 8/2007 | Lavin et al. | 430/5 |
| 2005/0055658 A1 | 3/2005 | Mukherjec et al. | |
| 2005/0153212 A1 | 7/2005 | Lavin et al. | |
| 2005/0229131 A1* | 10/2005 | Wu et al. | 716/8 |

OTHER PUBLICATIONS

P.LaCour et al., "Model-Based OPC for Sub-Resolution Assist Feature Enhanced Layouts," 2002 Proceedings of SPIE, vol. 4692, pp. 540-546.*
Title: The Problem Of Optimal Placement Of Sub-Resolution Assist Features (SRAF) Author: Mukherjee, et al Optical Microlithography XVIII—Mar. 1-4, 2005, San Jose California SPIE—vol. 5754—Part three of Three Parts, no page #s.

* cited by examiner

*Primary Examiner*—Leigh M. Garbowski
(74) *Attorney, Agent, or Firm*—Todd M. C. Li

(57) ABSTRACT

A method, program product and system is disclosed for performing optical proximity correction (OPC) wherein mask shapes are fragmented based on the effective image processing influence of neighboring shapes on the shape to be fragmented. Neighboring shapes are smoothed prior to determining their influence on the fragmentation of the shape of interest, where the amount of smoothing of a neighboring shape increases as the influence of the neighboring shape on the image process of the shape of interest decreases. A preferred embodiment includes the use of multiple regions of interactions (ROIs) around the shape of interest, and assigning a smoothing parameter to a given ROI that increases as the influence of shapes in that ROI decreases with respect to the shape to be fragmented. The invention provides for accurate OPC that is also efficient.

21 Claims, 18 Drawing Sheets

OPTICAL PROXIMITY CORRECTION USING PROGRESSIVELY SMOOTHED MASK SHAPES

TECHNICAL FIELD

The present invention relates in general to lithographic processes and, more particularly, to a method for correcting a mask layout of an integrated circuit for lithographic processing effects.

BACKGROUND OF THE INVENTION

In the manufacture of integrated circuits, photolithography, or lithography, is typically used to transfer patterns relating to the layout of an integrated circuit onto a wafer substrate, including, but not limited to, materials such as silicon, silicon germainium (SiGe), silicon-on-insulator (SOI), or various combinations thereof. The drive to improve performance of very-large-scale integrated (VLSI) circuits results in increasing requirements to decrease the size of features and increase the density of layouts. This in turn increasingly requires the use of resolution-enhancement techniques (RET) to extend the capabilities of optical lithographic processes. RET includes techniques such as the use of optical proximity correction (OPC), subresolution-assist-feature-enhanced lithography (SRAF) and phase-shifted-mask-enhanced lithography (PSM).

In spite of the spectacular advancement of several forms of Resolution Enhancement Techniques (RET), the iterative Model-Based Optical Proximity Correction (MBOPC) has established itself as a method of choice for compensation of the mask shapes for lithographic process effects. Conventional MBOPC tools work include the following steps in a manner similar to the following. The shapes on the mask design (henceforth referred to as the mask) are typically defined as polygons. A pre-processing step is performed that divides the edges of each mask shape into smaller line segments. At the heart of the MBOPC tool is a simulator that simulates the image intensity at a particular point, which is typically at the center of each of the line segments. The segments are then moved back and forth, i.e. outward or inward from the feature interior, from their original position on the mask shape at each iteration step of the MBOPC. The iteration stops when (as a result of the modification of the mask shapes) the image intensity at these pre-selected points matches a threshold intensity level, within a tolerance limit.

While the quality of the OPC may improve as the number of segments increases, the efficiency of an MBOPC tool may decrease as the number of segments it simulates and iterates over in each iterative step increases. The number of segments in turn depends on the number of edges in each mask shape. Therefore, it is desirable that the segments that are corrected are only those necessary to obtain the desired lithographic quality.

Segmentation is typically performed in two ways. The first type of segmentation depends on a particular mask shape itself. This type of segmentation tries to capture the variations of the shapes such as corners, jogs, etc. An example of such segmentation is illustrated in FIG. 1A. Two mask shapes 100 and 110 are shown. In this example, mask shape 100 is segmented by placing nodes a, b, c, . . . x, which define edges of segments, at corners a, d, g, j, m, p, s and v, of the polygon that outlines shape 100, and includes some nodes intermediate between the corners. The lengths of the segments and spacing of intermediate nodes is typically determined by criteria such as mask manufacturability constraints and the ability of the MBOPC to accurately reproduce mask shapes on the wafers. For purposes of illustration, only the segmentation of mask shape 100 is illustrated, but neighboring shape 110 could be segmented in a like manner.

A second type of segmentation is imposed on a mask shape by its neighboring shapes. This type of segmentation scheme uses a local space and width dependence. An example of such a segmentation is illustrated in FIG. 1B. For example, mask shape 200 may be segmented by the proximity of a neighboring mask shape 210 in which portions of the neighboring shape 210 are positioned a distance D less than an pre-determined threshold spacing distance. The threshold spacing rule results in the creation of nodes aa, bb, cc, dd, ee and ff on the affected mask shape 200, defining line segments connecting those nodes. The two types of fragments illustrated in FIG. 1A and FIG. 1B are referred to hereinafter as primary fragments, or fragmentations, and the associated nodes are referred to as fragmentation points.

In additions to the fragmentation points shown in both FIG. 1A and FIG. 1B above, some MBOPC methodologies advocate additional secondary fragmentations around each of the primary fragmentations The secondary fragmentation provide for smoother OPC convergences. Referring to FIG. 2A, a set of mask edges 220 are fragmented by primary nodes A, B, C, D, E, F, G. The resulting simulated wafer shape, or image, 221 is the curved line that is superimposed on the mask shape 220. It can be seen that the features of the desired wafer shape, such as corner C and edges AB and EDC are not very well reproduced by the simulated image 221. In FIG. 2B, the mask edges 220 are shown again with the same primary nodes A through G. In addition, a set of secondary nodes B', B", C', C", D', D", E', E", F' and F", are inserted around the primary nodes A, B, C, D, E and F, respectively, creating finer fragmentations defined by primary and secondary nodes. The presence of the secondary nodes allow improved simulation accuracy compared to use of primary nodes alone. The resulting simulated wafer shape 222 more closely matches the mask shape 220 than the simulated wafer shape 221 based on the primary node fragmentation of FIG. 2A. FIG. 3 illustrates a flow diagram of the process of fragmentation according to a conventional OPC fragmentation scheme. First, a mask layout is provided, for example, by providing a list of shapes (Block 301). Then, for each shape in the list (Block 302), the following steps are performed:

Determine an effective region of interaction (hereinafter simply referred to as ROI) (Block 303) for a given shape i, according to pre-determined spacing and width rules. The effective ROI is the region enclosed by a boundary that is at a distance beyond which a feature outside of that boundary in the layout does not have a substantial effect on the optical process of imaging a particular feature. Stated another way, features outside of the ROI boundary will have substantially insignificant effects, for practical purposes, on the optical process of imaging the particular feature around which the ROI is formed. The optical factors used to define the optical process conditions may include, but are not limited to, wavelength of illumination light, numerical aperture, resist properties, etc. For a given shape i, fragment the shape according to its own polygon corners (Block 304).

Next, fragment shape i according to the proximity of other shapes' edges within the ROI (Block 305). The fragments formed according to Blocks 304, 305 are referred to as primary fragments.

Then, after all shapes have been fragmented, according to another set of rules the fragmentation is cleaned up (Block 306). The rules for cleaning up the fragmentation are typically determined by mask manufacturability and process constraints. Examples of such rules include, but are not limited to, minimum feature size, minimum line width, minimum spacing, etc.

The position at which an edge prints is influenced by other nearby mask polygons. Large perturbing features have a stronger influence than small features, but in general the interaction will fall off with increasing separation. Partially coherent image formation is a nonlinear process, so the falloff in interaction is not a fixed function of distance. However, the general scaling behavior is that of the so-called lens impulse response function, also known as the Airy function. Mathematically, the Airy function is $[J_1(2\pi \cdot s)/(\pi \cdot s)]^2$, where $J_1$ is the first Bessel function, and s is a dimensionless position coordinate in the image plane, defined as $s=x \cdot NA/\lambda$, where x is the position as measured in conventional length units and NA is the effective numerical aperture of the lithographic system, and $\lambda$ is the wavelength of the illumination light.

Although the interaction between features is nonlinear, one can say that feature to feature interaction will decrease with separation at a rate between the envelope of the Airy function, which falls as the cube of separation distance, d, and the square-root of this envelope, which falls as approximately $d^{3/2}$, as illustrated in the plots shown in FIG. 4. The former case corresponds to completely incoherent interaction 12, and the latter case to completely coherent interaction 14. The curves in FIG. 4 assume an ideal lens; additional weak interaction at longer distance scales may also be present, for example, due to lens flare. The plotted curves are normalized, so that the area of the interacting, perturbing feature is not considered. However, because interaction falls with increasing separation between features, it becomes acceptable to neglect the influence of small details in interacting, perturbing shapes that are appreciably distant from the shape or feature undergoing fragmentation.

It would be clear from FIG. 1B that any details in a mask feature would interact during the fragmentation procedure to create corresponding segmentations on a neighboring mask shape. Some of those fragments may be created by variations of a neighboring shape that is quite far away from the main shape. As can be seen in FIG. 4, some of those distant fragments may have very little impact on the resulting wafer image simulation. Such segmentations would eventually contribute to the inefficiency of the MBOPC. This inefficiency is exacerbated by the fact, as illustrated in FIG. 4, that the further away a neighboring shape is located, the smaller the proximity effects on a particular mask shape. However, in the conventional OPC methodology, there does not exist any process to take advantage of the above fact.

The effect of the numerous fragmentations due to neighboring shapes is getting worse with technology because of factors such as the following:

1. As the lithographic process is moving deep into sub wavelength technology, and the same wavelength is being used for smaller and smaller technology, the number of neighboring shapes within the Region of Interaction (ROI), which is controlled by the factor $\lambda/NA$, is getting larger and larger.
2. For applications of double exposure mask technology, such as the alternating PSM mask at the critical levels, the effects of optical flare may play a significant role. This means that MBOPC software tools would need to consider a larger ROI than for previous technologies. Thus, more neighboring shapes would be now placed within the ROI than before.
3. Many RET require more coherent illumination and this expands the ROI. The result is that more shapes have a lithographic interaction with a given shape of interest, resulting in an increase in fragmentation of a given shape.

Accordingly, it would be desirable to provide a method for segmenting mask shapes in a manner that improves the efficiency of the MBOPC while not reducing the quality or effectiveness of the OPC.

SUMMARY OF THE INVENTION

It is an objective of the present invention to provide a method, a program product and computer system capable of performing the method, in which OPC is performed that is efficient in use of memory and in computational performance while also providing accurate OPC.

Accordingly, a method of performing optical proximity correction (OPC) is provided comprising the steps of: identifying a feature of interest having edges to be fragmented; identifying one or more influencing features different from said feature of interest; smoothing said one or more influencing features to form smoothed influencing features smoothed edges, wherein an amount of smoothing of said one or more influencing features varies in accordance with the influence of said influencing feature on an image process of said feature of interest; defining fragments of edges of said feature of interest in accordance with said smoothed edges of said smoothed influencing features; and performing OPC of said feature of interest wherein said OPC comprises adjusting said fragments of edges of said feature of interest.

According to another aspect of the invention, a plurality of regions of interaction (ROIs) are identified around the feature of interest to be fragmented, so that each of the plurality of ROIs contains at least a portion of said one or more influencing features; and a smoothing parameter is provided that corresponds to each of said plurality of ROIs in accordance with an amount of influence of said at least a portion of said one or more influencing features on said image process of said feature of interest; and wherein said smoothing is performed on each of said at least a portion of said one or more influencing features within each of said plurality of ROIs in accordance with said corresponding smoothing parameter.

The smoothing may be performed using any suitable method, such as Manhattan smoothing or smoothing in spatial frequency domain, for example, using low-pass filtering.

In the case of Manhattan filtering, a smoothing parameter assigned to each of the ROIs preferably comprises the dimension of an ortho object used for smoothing wherein each of the smoothing parameters increases in value in accordance with decreasing influence of the features or portions of features within each of the corresponding ROIs.

According to yet another aspect of the invention, an initial ROI may be identified around the feature of interest, and then the initial ROI may be divided into smaller sub-ROIs around the feature of interest. The sub-ROIs may be substantially homocentric with respect to each other.

BRIEF DESCRIPTION OF THE DRAWINGS

These and other features, aspects, and advantages will be more readily apparent and better understood from the following detailed description of the invention, with reference to the following figures wherein like designations denote like elements, which are not necessarily drawn to scale.

DETAILED DESCRIPTION

An objective of the embodiments of the invention described herein is to provide a method and system by which fragmentation or segmentation of mask shapes are determined such that there is sufficient fragmentation to permit reliable optical proximity correction (OPC), but limit the fragmentation to minimize the memory or computational requirements. Thus, according to embodiments of the invention, unnecessary variations are removed from the neighboring mask shapes that influence the fragmentation of a given edge of a mask shape. The further away that an influencing neighboring shape is from the edge to be fragmented, the smaller the influence the variations of the influencing shapes will affect the mask shape in consideration.

The advantage of the present invention is that it will reduce the number of unnecessary segmentations for mask shapes, which would improve the efficiency of the MBOPC iterations over the prior art. The reduced number of segments will also improve memory utilization of the MBOPC and also result in improved hierarchical handling for the OPC.

In accordance with the present invention, for a given edge of a mask shape to be segmented, each neighboring shape that would influence the fragmentation is identified, and classified by its proximity to the target edge, that is, according to its region of interaction (ROI). The further away a neighboring shape is, the less influence the details of its shape has on the image processing of the main shape. Therefore, it makes sense to remove unnecessary details for the shapes that are further away. Thus, in accordance with the present invention, multiple ROIs are defined around the edge to be fragmented, and the influencing neighboring shapes are smoothed to progressively remove details as the neighboring shape is located outside of a given ROI. Thus, in accordance with one embodiment of the invention, the amount by which a neighboring shape is smoothed depends on its proximity to the main shape.

Figure 1A:
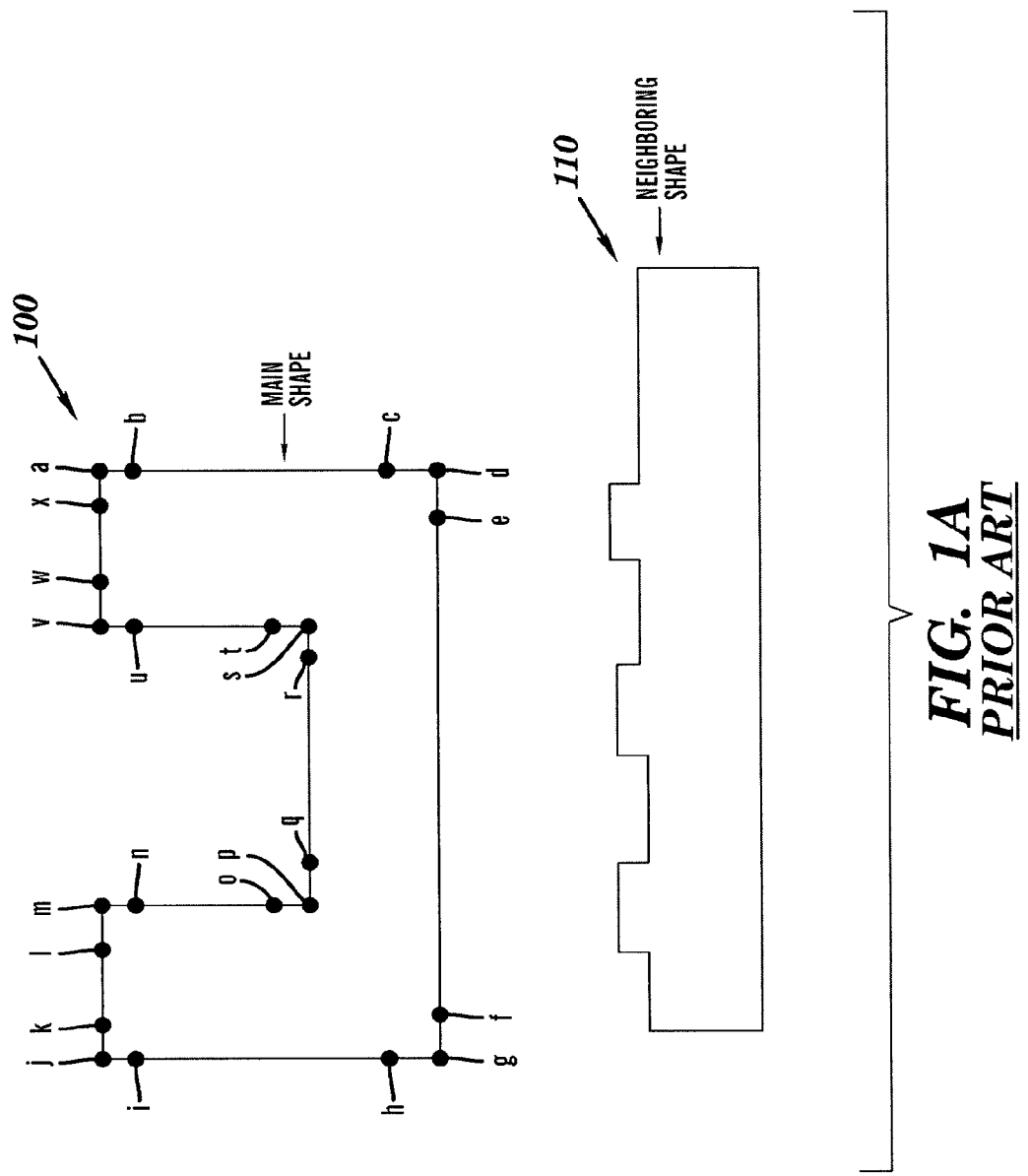
FIG. 1A illustrates a shape of interest to be fragmented.
Figure 1B:
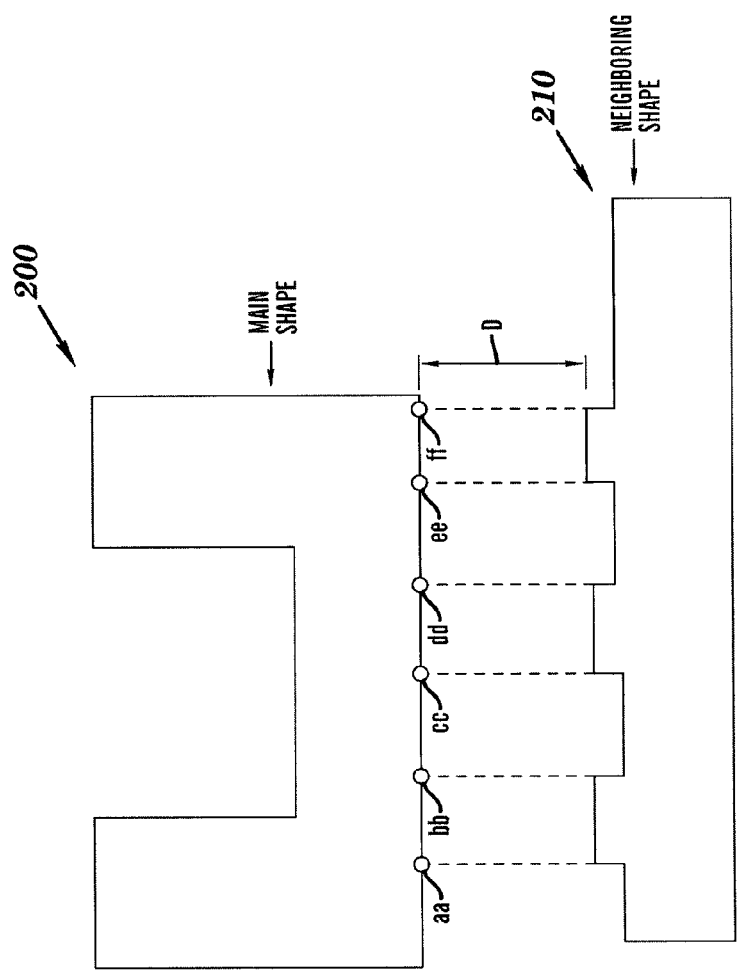
FIG. 1B illustrates a shape of interest to be fragmented and the influence of a neighboring shape on the fragmentation of the shape of interest.
Figure 2A:
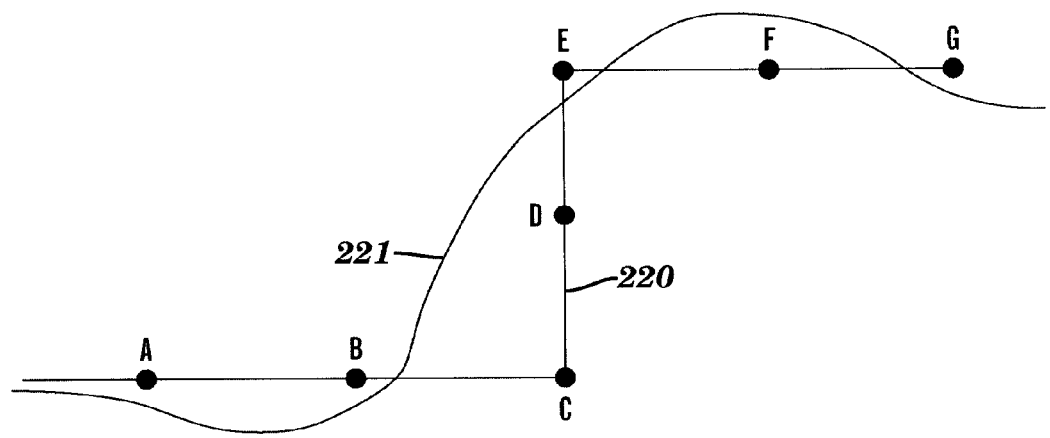
FIGS. 2A and 2B illustrate the use of secondary fragments.
Figure 2B:
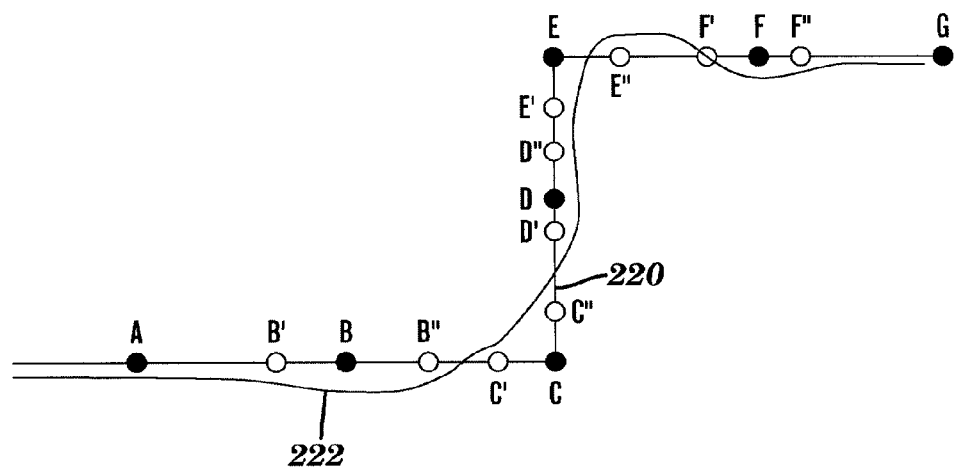
Figure 3:
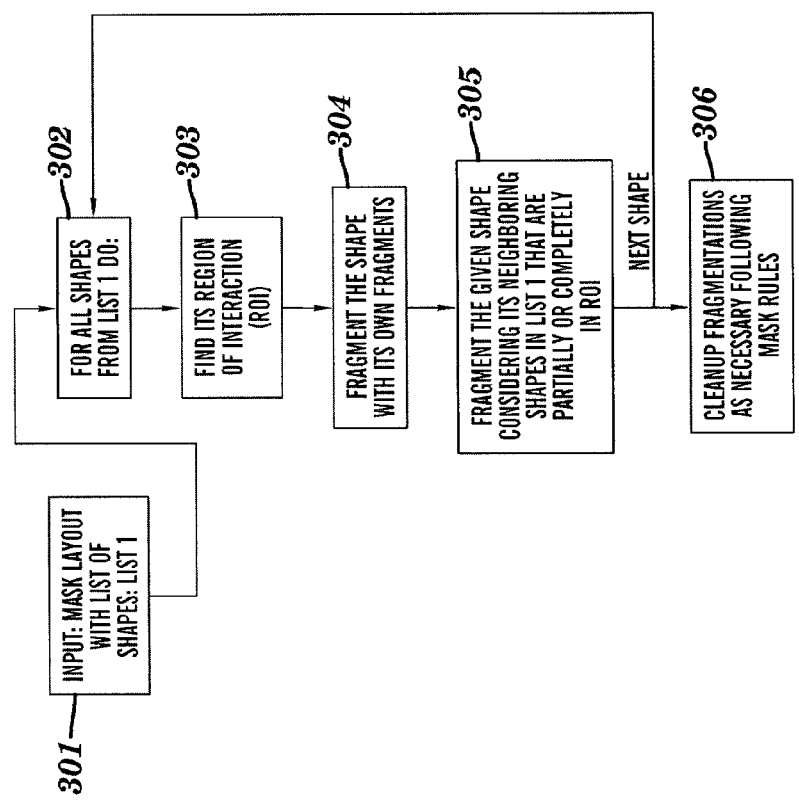
FIG. 3 illustrates a flow chart illustrating an embodiment of the method according to the invention.
Figure 4:
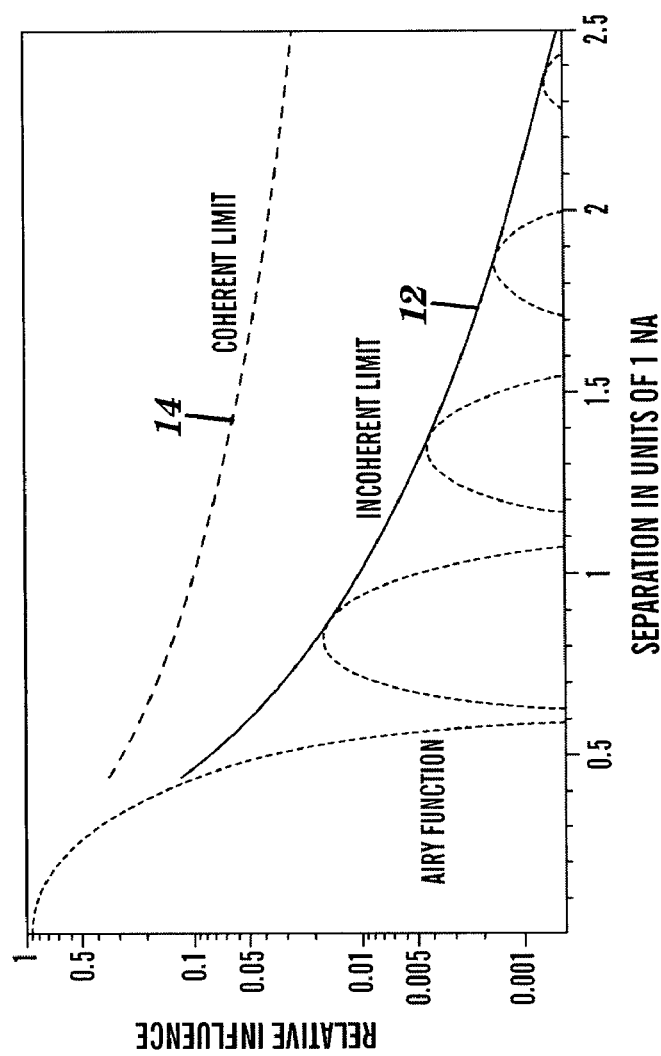
FIG. 4 illustrates a plot of the relative optical influence as a function of shape separation.
Figure 5A:
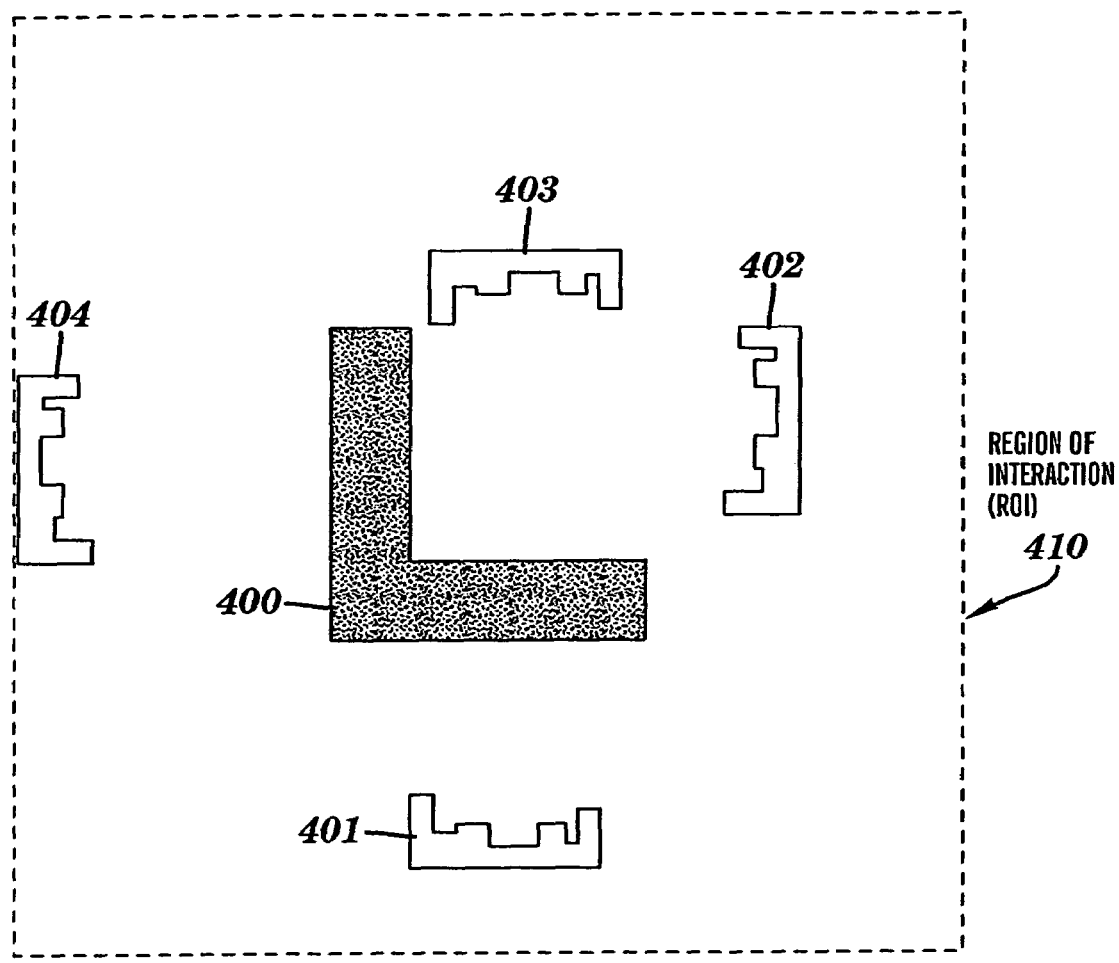
FIG. 5A illustrates a conventional region of interaction (ROI) containing a shape to be fragmented and neighboring shapes.

Conventionally, the neighboring shapes that remain within a single Region of Interaction (ROI) are considered for the simulation. An example of a single ROI 410 is shown in FIG. 5A. All the neighboring shapes 401, 402, 403, 404 that are within the ROI 410 are used to compute the fragmentation of the main shape 400, which is the shape of interest to be fragmented.

Figure 5B:
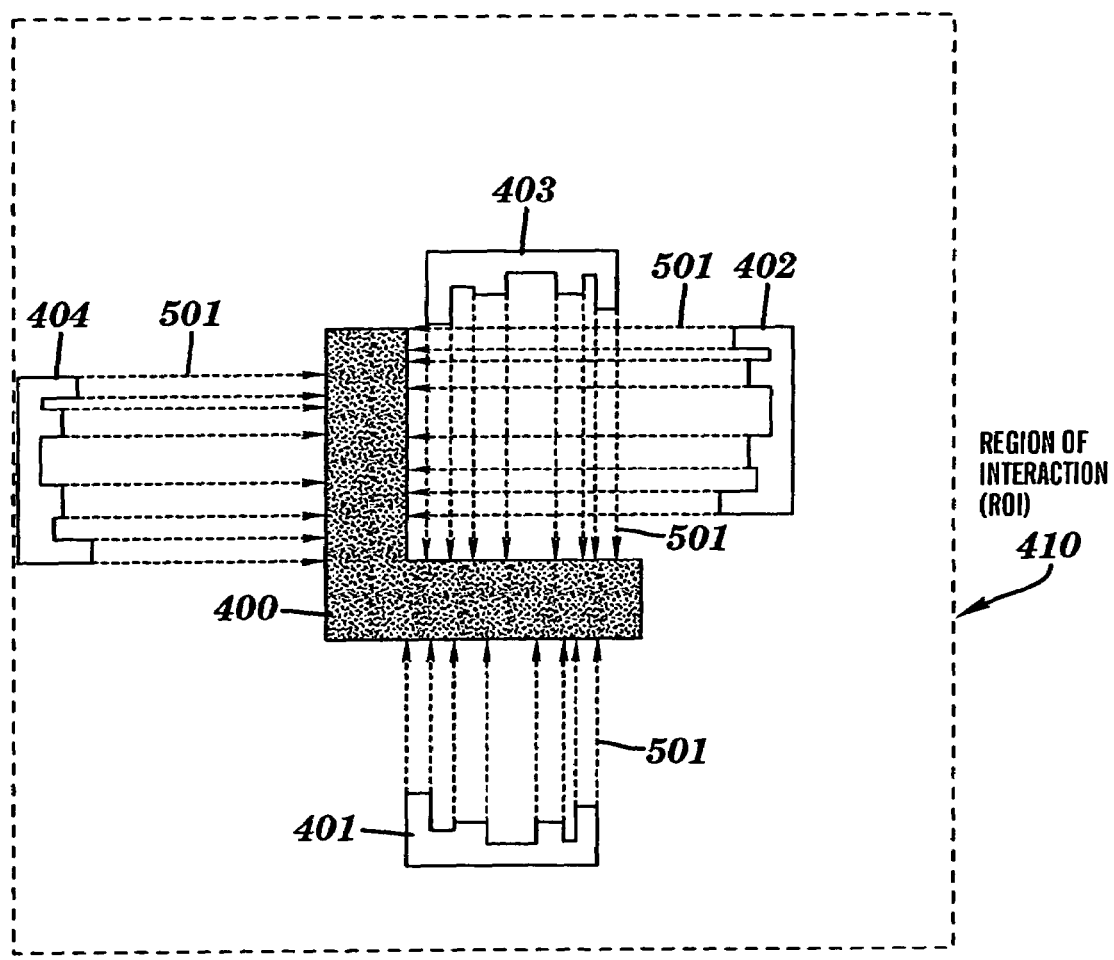
FIG. 5B illustrates a conventional fragmentation of a shape based on the influence of neighboring shapes.
Figure 6:
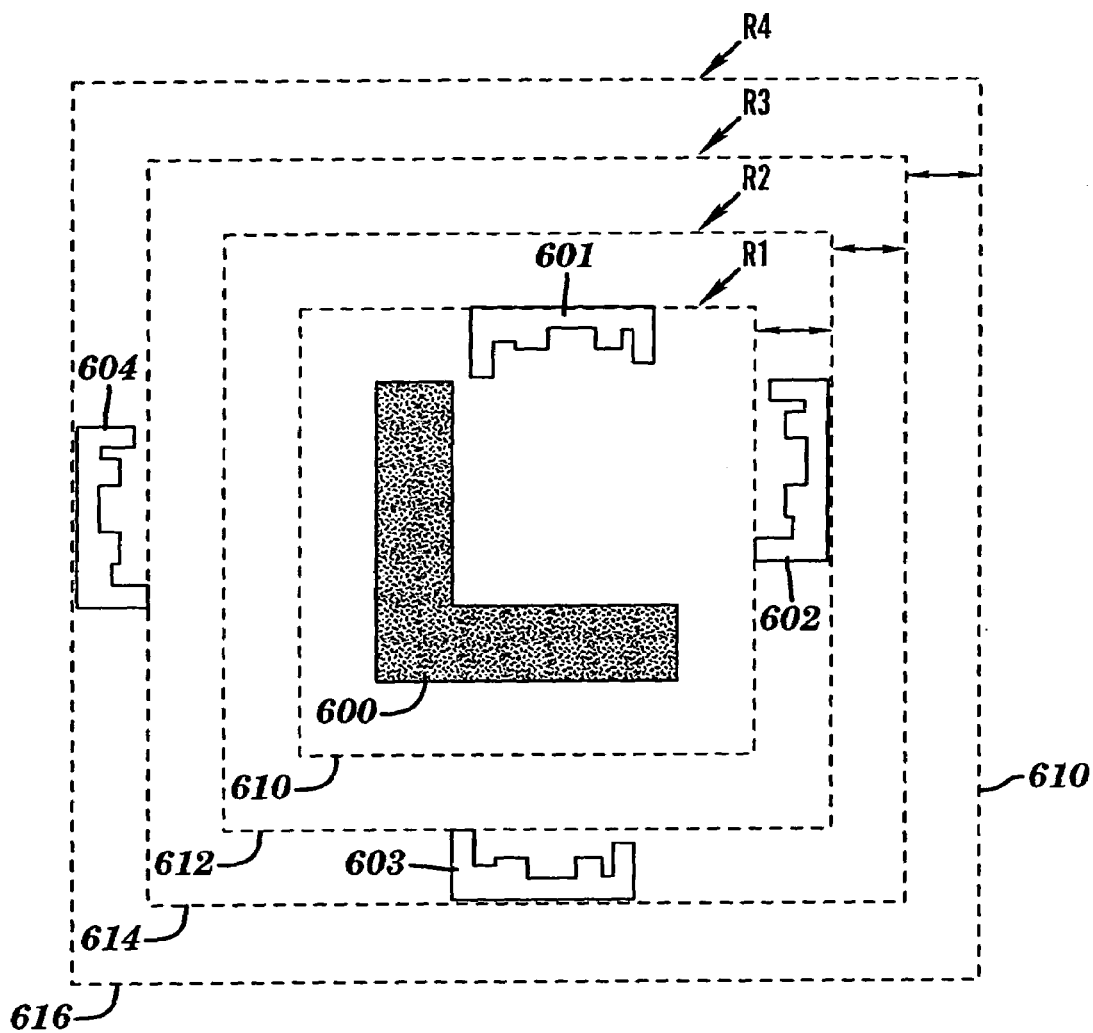
FIG. 6 illustrates multiple ROIs according to the invention.

The fragmentation of the main shape 400 in case of the prior art is shown in FIG. 5B. Each corner or vertex of the neighboring shapes 401, 402, 403 and 404, influence the fragmentation of the edges of the main shape 400, as indicated by the arrows 501. The number of primary fragmentations of primary shape 400 due to neighboring shapes 401, 402, 403 and 404 are thirty-two (32) in this example. If each primary fragmentation is accompanied by at least 5 secondary fragmentations, for improved accuracy, the total number of segments or fragments would be 160. In accordance with the present invention, the neighboring shapes are not considered as is. Rather, some of the neighboring shapes are smoothed before considering their influence on the fragmentation of the main shape. In order to apply the smoothing progressively, the single Region of Interaction (ROI) used for simulation is divided into several discrete sub-ROIs. The use of sub-ROIs is for illustrative purposes only, and one of ordinary skill would understand that a plurality of ROIs may be defined around a shape of interest without having to first define a primary ROI, or without having to form sub-ROIs out of a single ROI. Thus, ROIs may be defined as being contiguous or non-contiguous, and the embodiment is not intended to be a limiting example. Referring to FIG. 6, the single simulation ROI 610, which is enclosed by the outer boundary 616, is divided into four sub-regions or sub-ROIs, i.e., R1, R2, R3 and R4. In this embodiment, sub-ROI regions are divided so that the original ROI 610 is divided into equal parts, for example, by square-shaped boundaries that surround the main shape 600, and are approximately homocentric with respect to the other sub-ROIs. For example, sub-ROI region R1 is bounded by the inner boundary 610, while sub-ROI R2 is bounded by the inner boundary 610 and the next boundary 612. Similarly, sub-ROI R3 is bounded by the outer boundary 612 of sub-ROI R2 and the next distant boundary 614 and sub-ROI R4 is bounded by the boundary 614 and the outer boundary 616 of the original ROI 610. However, the ROI regions may be formed using other shapes, such as circles or octagons, as suitable for the purpose of approximating the effective regions of optical influence, and the sub-ROIs surrounding the main shape may be formed by dividing the original ROI into non-equal parts, by using some reasonable criteria. The neighboring shape 601 within the region R1 is the one closest to the main shape 600. Therefore, in accordance with the present embodiment, no or minimal smoothing is applied to the shapes within the closest sub-ROI R1. It is assumed in the current embodiment that all the variations are significant for the shapes that are closest to the main shape. However, in some designs, mask shapes may include sub-resolution features that are lithographically insignificant at any distance. These sub-resolution features may be pre-smoothed in the design before applying the model based OPC. Smoothing may be performed by any suitable method, such as by sequential grow and shrink operations, for example, in a manner similar to Minkowski's Sum and Difference, described further below and discussed in co-pending and co-assigned U.S. application Ser. No. 10/707,778, filed Jan. 12, 2004, the contents of which are incorporated herein by reference. Other suitable smoothing methods may be used, such as low-pass filtering in the spatial frequency domain, and may include any smoothing methods known presently to those skilled in the art or developed in the future.

A Minkowski's Sum of an object in the two-dimensional Euclidean domain is defined by rolling a ball of radius r along the exterior boundary of the object and taking the point-set union of the original object and the area swept by the rolling ball. A Minkowski's Difference on an object in the two dimensional Euclidean domain is defined by rolling a ball of radius r along the interior boundary of the object and taking the point-set difference of the area swept by the rolling ball from the original object. In this embodiment, since for manufacturing purposes, the mask shapes have edges that are in general substantially orthogonal in nature, smoothing is preferably performed using a sequential shrink and grow operations similar to Minkowski's Sum and Difference smoothing, where the shrink and grow smoothing operation is performed using an ortho smoothing object having edges parallel to the substantially orthogonal edges of the object.

Figure 11:
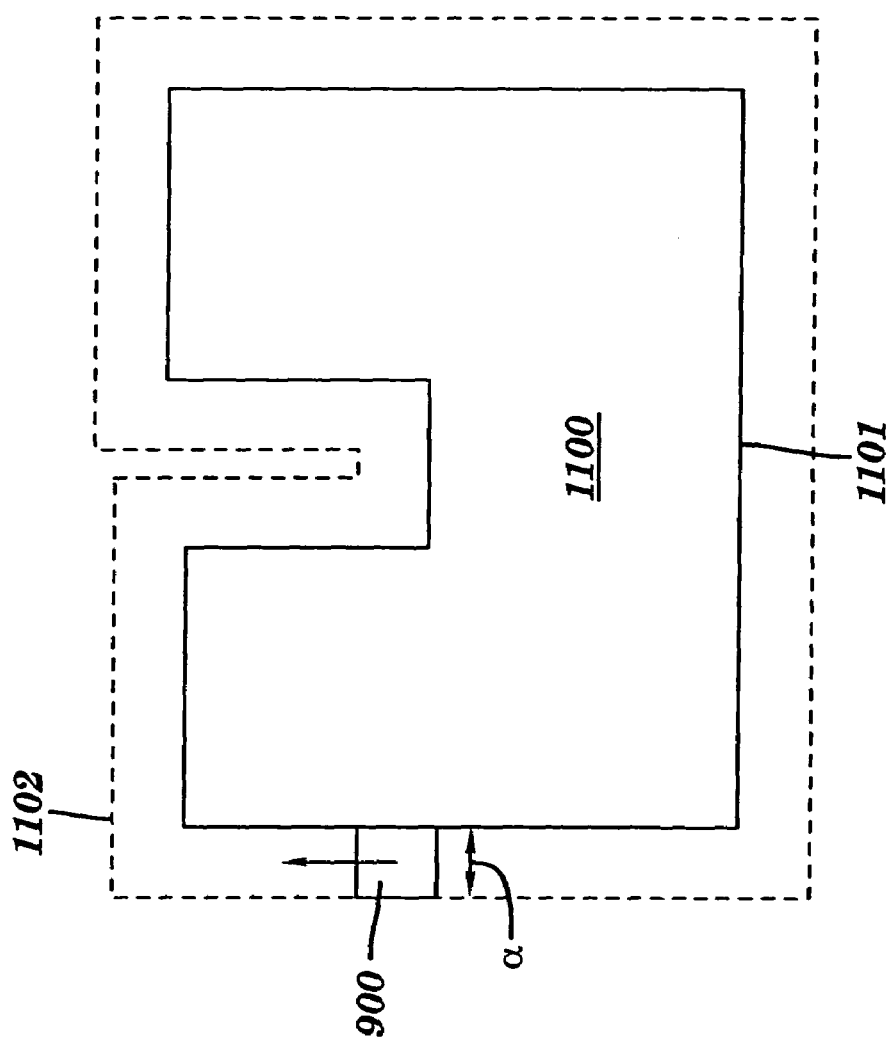
FIG. 11 illustrates a Manhattan grow operation.
Figure 12:
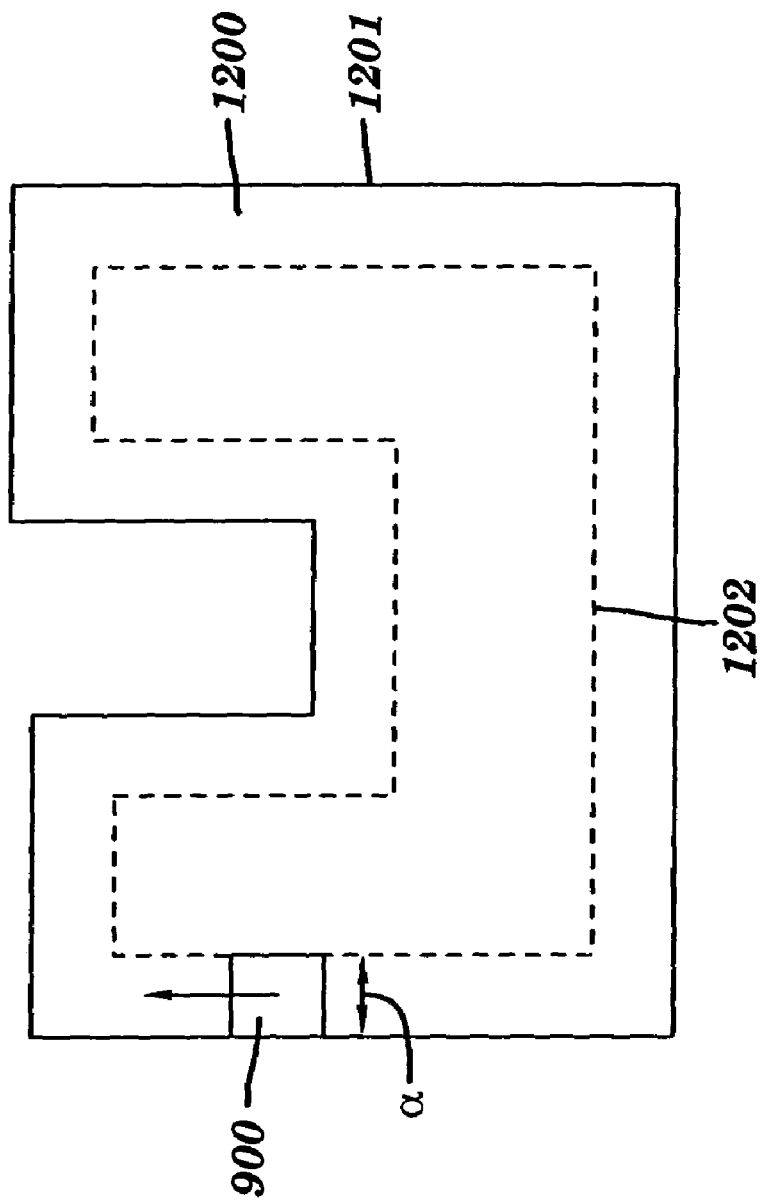
FIG. 12 illustrates a Manhattan shrink operation.

For example, referring to FIG. 11, a mask shape 1100 having an outer boundary 1101 is illustrated undergoing a grow operation, in which a square object 900 having a side of predetermined length $\alpha$, which can be thought of as a predefined shrink or grow parameter a having a length dimension. Similarly, in FIG. 12, mask shape 1200 having outer boundary 1201 is undergoing a shrink operation using an object 900, which in this example is a square, having a shrink parameter $\alpha$. The grow operation illustrated in FIG. 11 is performed by analogy with Minkowski's Sum operation by sliding the ortho object 900 having smoothing dimension a and taking the point-set union of the original object 1100 and the area swept by the ortho object 900, to form the point-set union having an outer boundary 1102. This is referred to hereinafter as a Manhattan Sum 1102. In a similar manner, the shrink operation illustrated in FIG. 12 is performed by sliding the ortho object 900 having smoothing parameter a and taking the point-set difference of the original object 1200 and the area swept by the ortho object 900 to form the point-set union having the outer boundary 1202. This is referred to hereinafter as a Manhattan Difference 1202. In the case where the ortho smoothing object is a square, the output shape after such a smoothing operation will not have any edge whose length is less than $\alpha$. More generally, any smoothing algorithm may be used where the shapes after smoothing does not have any feature that is smaller than a grow or shrink parameter $\alpha$. The value of $\alpha$ is preferably determined based on the values of lithographic parameters such as numerical aperture NA, the wave length of illumination light $\lambda$ and the distance of the influencing shape from the main shape to be fragmented.

Figure 13:
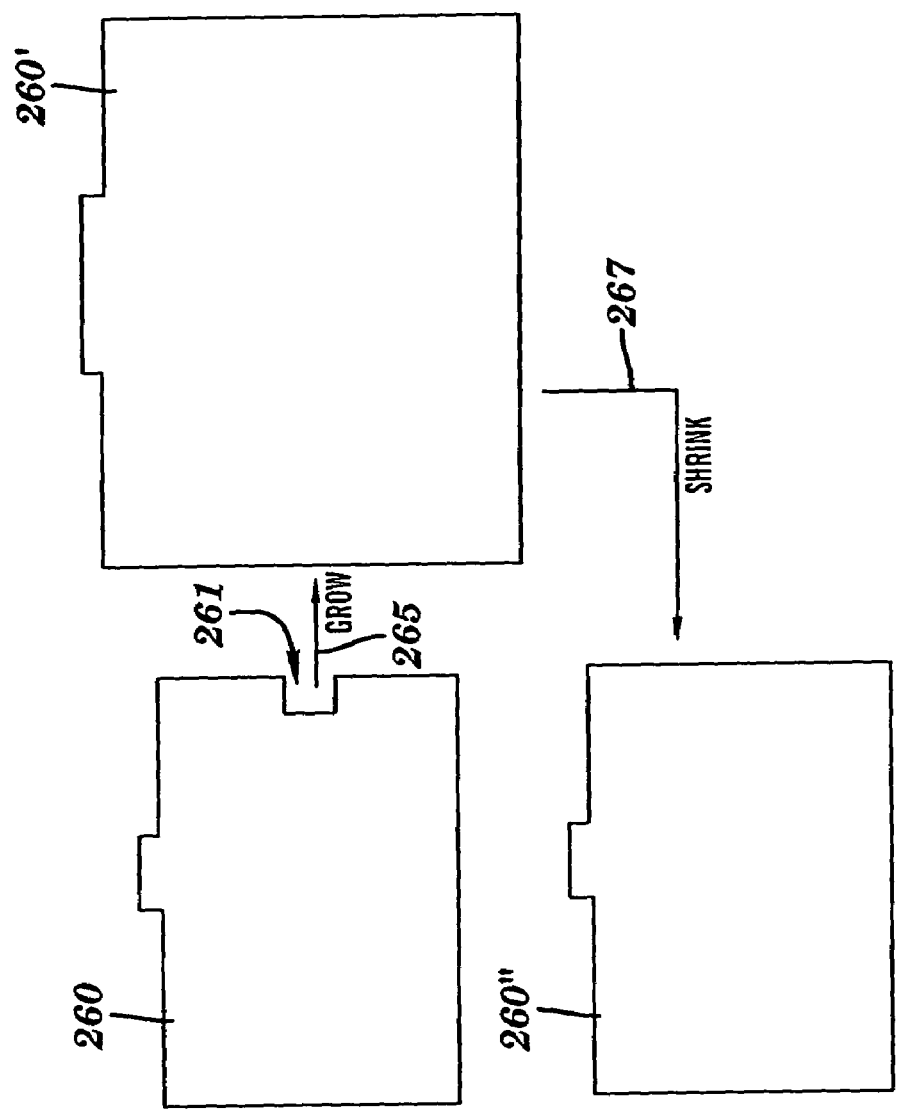
FIG. 13 illustrates a grow operation followed by a shrink operation.

A grow operation followed by a shrink operation can eliminate small dents in a shape, as illustrated in FIG. 13. Dent 261 is present initially in shape 260. after a grow operation 265, the resulting shape 260' is formed, and the dent 261 is no longer present, but the shape 260' is larger than the original shape 260. A shrink operation 267 is performed, resulting in a smoothed shape 260'', which is roughly the same size as the original shape 260, but has dent 261 removed.

Figure 14:
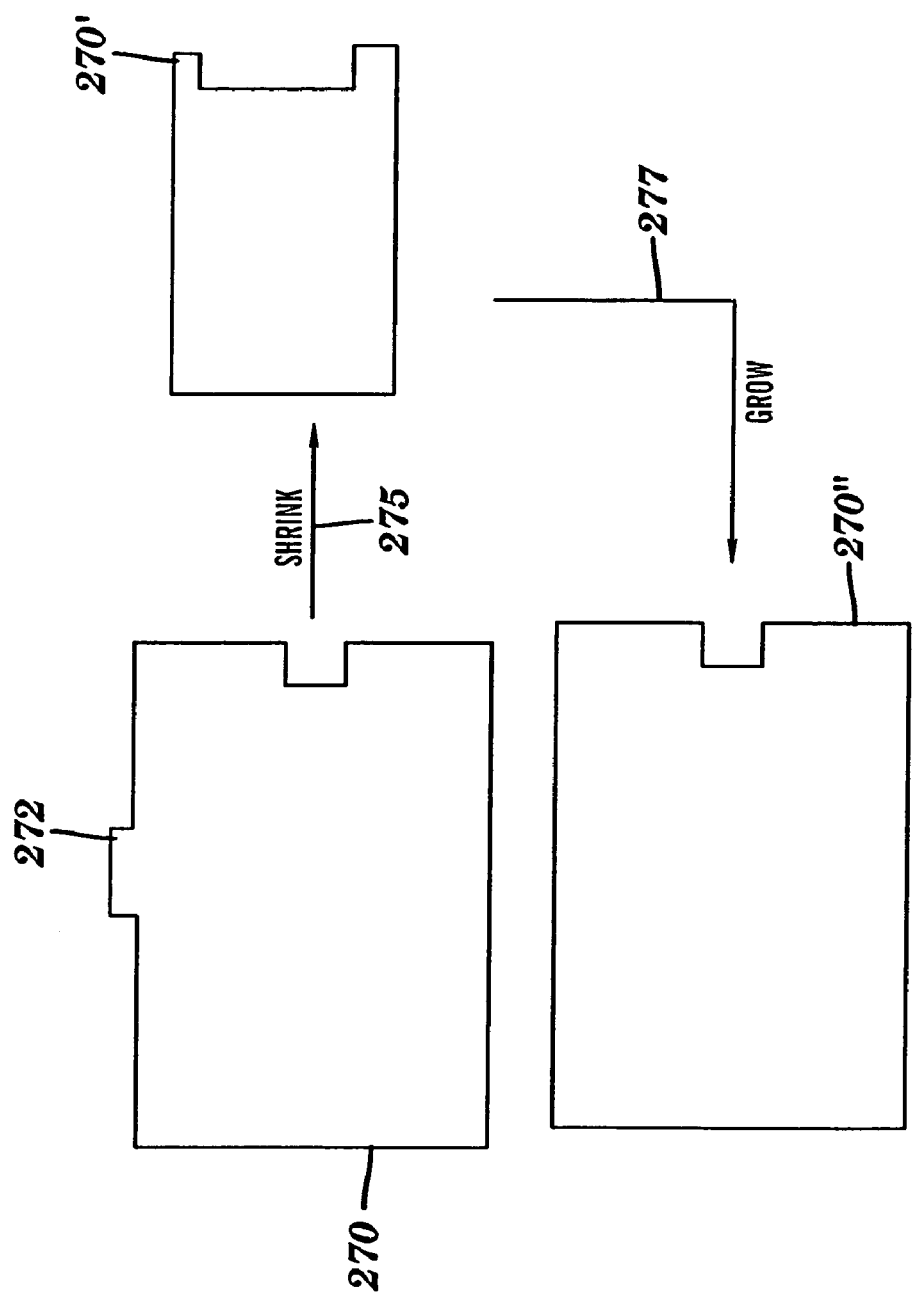
FIG. 14 illustrates a shrink operation followed by a grow operation.

Referring to FIG. 14, a shrink operation followed by a grow operation can eliminate small protrusions within the shape. Shape 270 initially includes a protrusion 272. After shrink operation 275, the resulting shape 270' is smaller than the original shape 270, but the protrusion 272 is absent. After a subsequent grow operation 277, the resulting shape 270'' is roughly the same size as the original shape 270, but the protrusion 272 has been removed.

Figure 15:
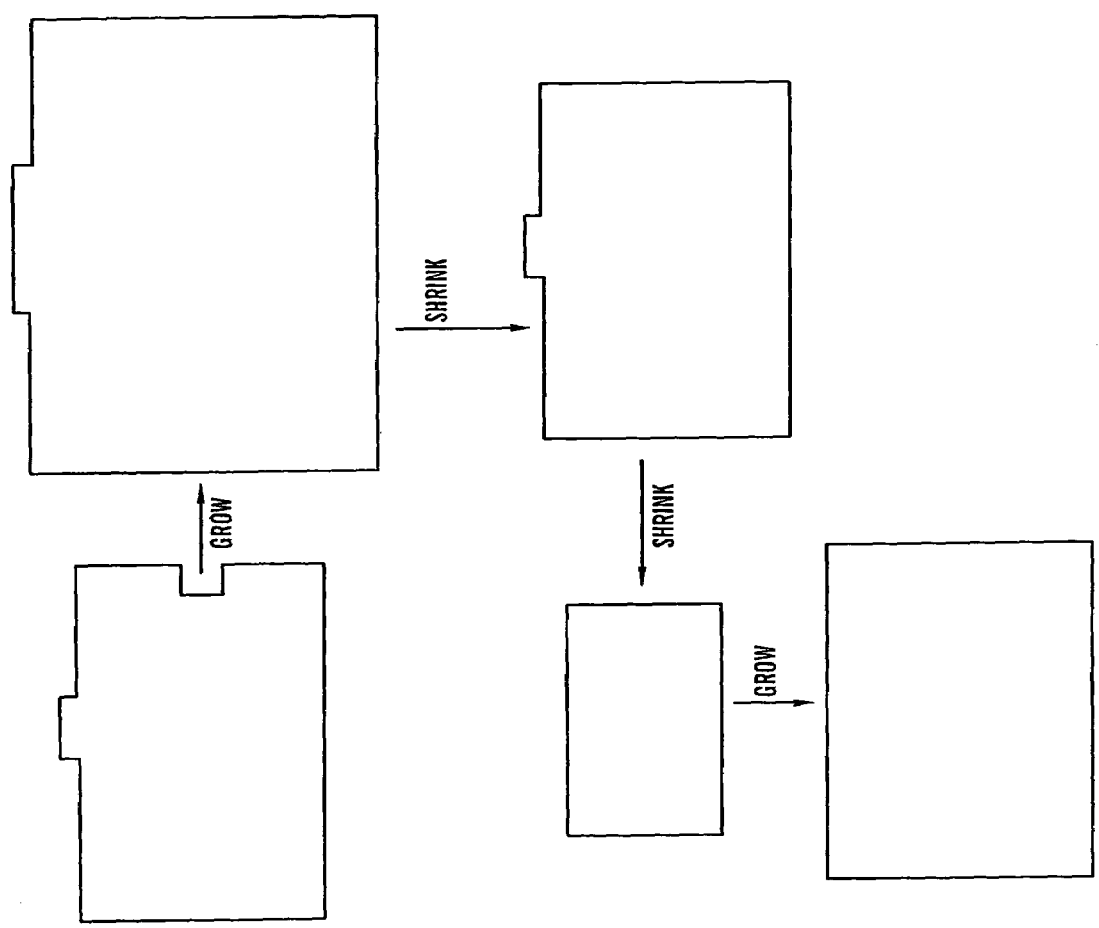
FIG. 15 illustrates a sequence of grow and shrink operations to perform smoothing.

Therefore, to remove both dents and protrusions, a sequence of both grow and shrink operations are preferably applied, for example, as illustrated in FIG. 15. Various combinations of grow and shrink operations may be applied to achieve the desired smoothing, as would be understood by one skilled in the art. Any such combination of Manhattan grow and shrink operations is hereinafter referred to as Manhattan smoothing.

In this embodiment of the invention, each sub-ROI region is assigned a different smoothing parameter. For example, sub-ROI regions R1, R2, R3 and R4 are assigned smoothing parameters $\alpha 1$, $\alpha 2$, $\alpha 3$, $\alpha 4$, respectively, where $0 \leq \alpha 1 < \alpha 2 < \alpha 3 < \alpha 4$.

With reference to the sub-ROI regions of FIG. 6, shapes within region sub-ROI R1 either do not get any smoothing at all, or may get smoothing with a small smoothing parameter $\alpha 1$. The neighboring shape 602 within sub-ROI R2 is a little further away from the main shape 600 and consequently such shapes within sub-ROI R2 are smoothed with a smoothing parameter of $\alpha 2$ before the shapes within the sub-ROI R2 are used for fragmenting the main shape 600. The shapes 603 in sub-ROI R3 are smoothed with a smoothing parameter of $\alpha 3$ and the shapes 604 in sub-ROI R4 are smoothed with a smoothing parameter of $\alpha 4$ before they are used for fragmentation of the main shape 600.

Figure 7:
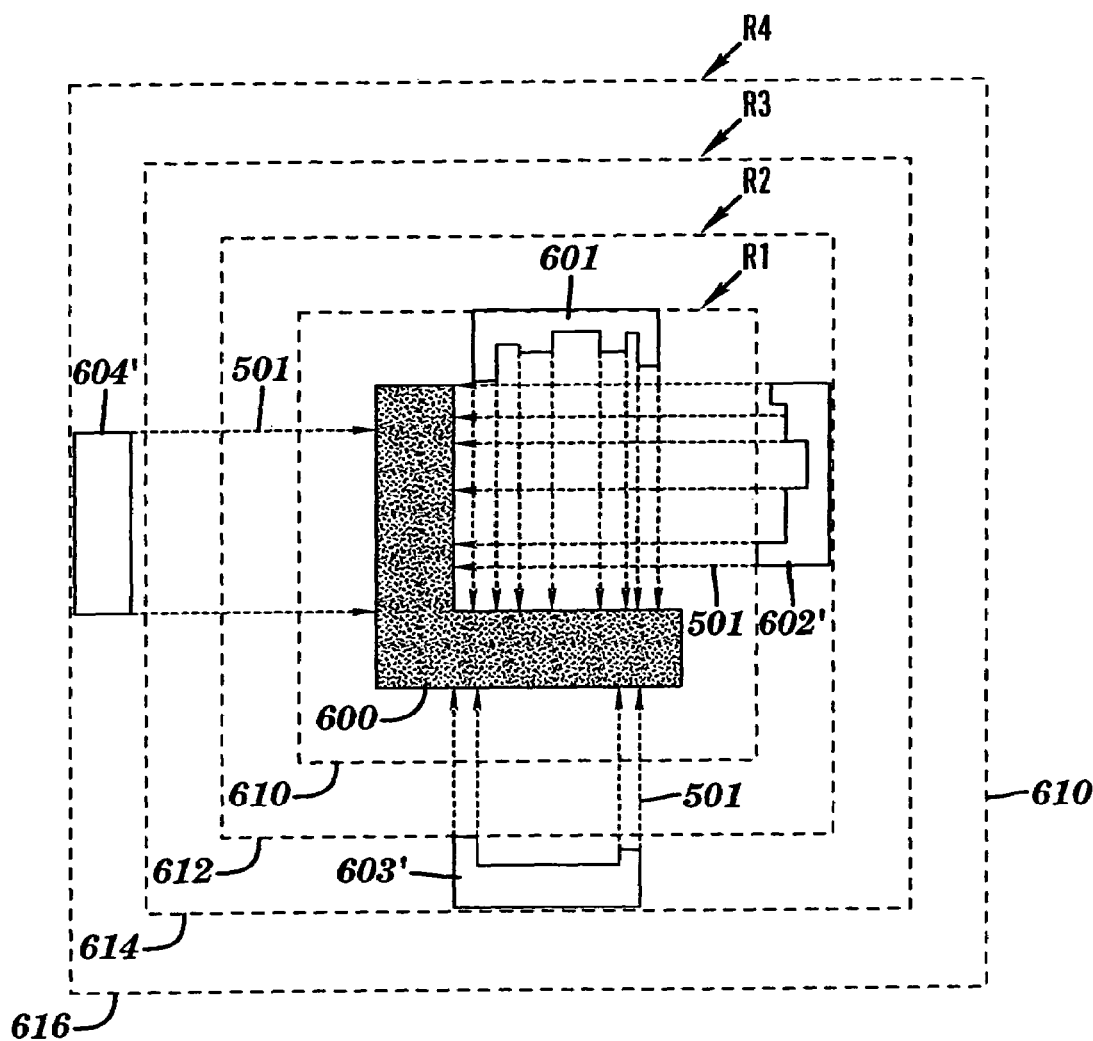
FIG. 7 illustrates fragmentation of a shape based on smoothed neighboring shapes according to one embodiment of the invention.

The resulting shapes and fragmentations are illustrated in FIG. 7. In this example, the neighboring shapes 602, 603 and 604 that are outside of the nearest sub-ROI R1 have some degree of smoothing, which results in smoothed shapes 602', 603' and 604', respectively. The smoothing reduces the number of influencing details or interacting edges, and thus, as indicated by the dashed arrows 501, in this case, there are only 20 primary fragmentations resulting in only 100 secondary fragmentations. Note that the smoothed neighboring shapes 602', 603', 604' do not replace the original shapes 602, 603, 604. Rather, the smoothed shapes 602', 603', 604' are formed for the purpose of progressive fragmentation, and may be stored, for example, computer memory or disk storage, in addition to the original shapes 602, 603, 604.

Figure 8:
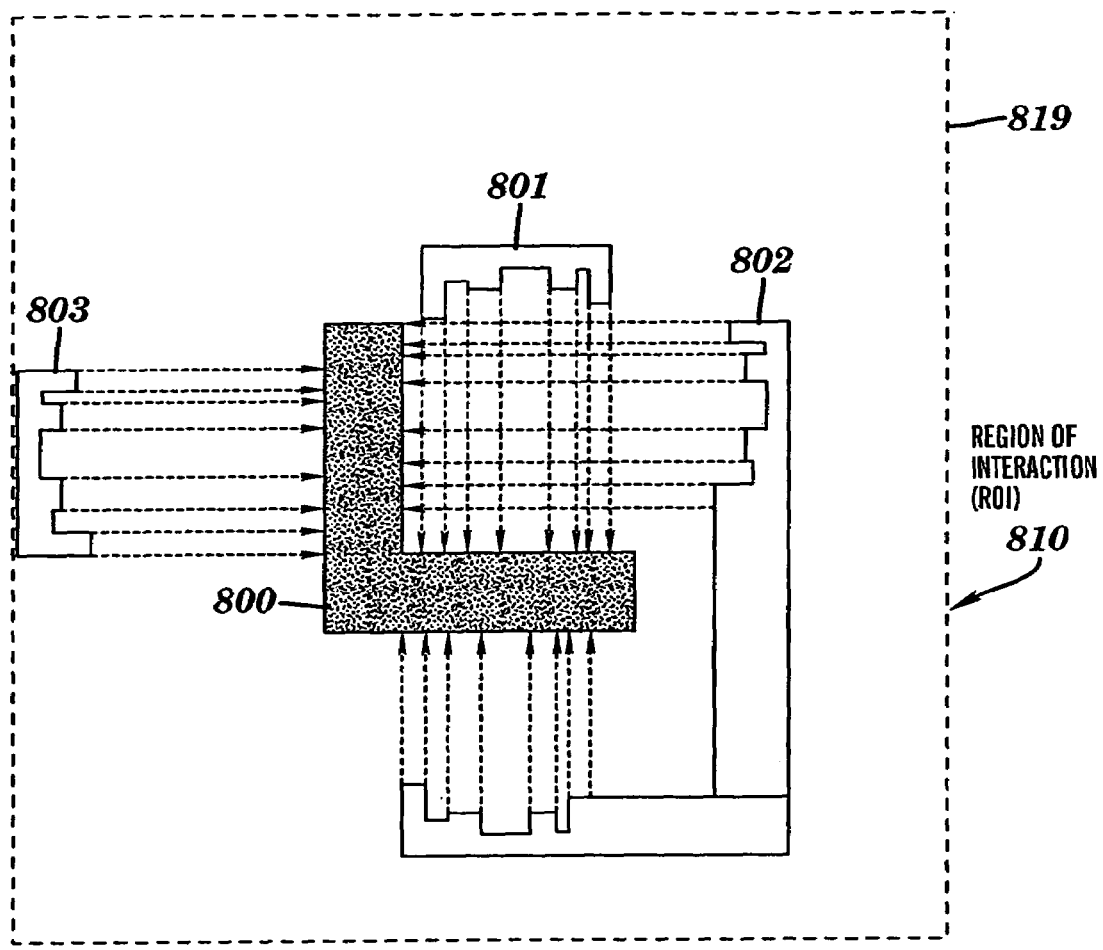
FIG. 8 illustrates a conventional fragmentation of a shape based on the influence of neighboring shapes.
Figure 9:
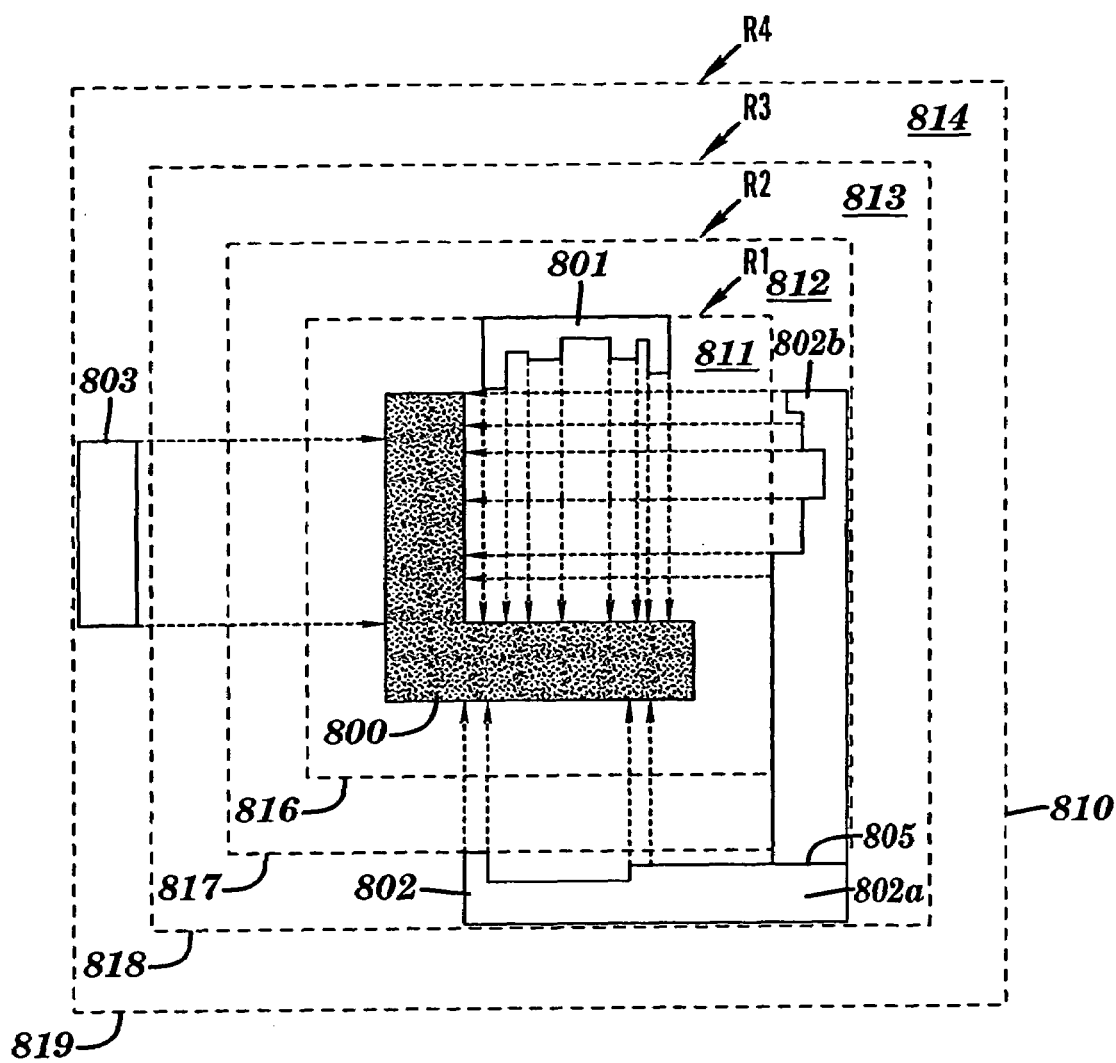
FIG. 9 illustrates fragmentation of a shape based on smoothed neighboring shapes according to one embodiment of the invention.

Though the above embodiment of the invention has been demonstrated for small neighboring shapes, the inventive methodology can be applied to neighboring shapes that span several sub-regions or sub-ROIs of the primary ROI. Referring to FIG. 8, the primary ROI 810 having outer boundary 819 encompasses a main shape 800 and neighboring shapes 801, 802 and 803. FIG. 9 illustrates the primary ROI 810 divided into sub-ROIs R1 811 (having outer boundary 816), R2 812 (having inner boundary 816 and outer boundary 817), R3 813 (having inner boundary 817 and outer boundary 818) and R4 814 (having inner boundary 818 and outer boundary 819). In this case, one neighboring shape 802 spans sub-ROI R2 (812) and R3 (813). In this embodiment of the invention, the neighboring shape 802 is divided according to the parts of the shape 802 that crosses the boundary of the sub-ROI's. In this case the neighboring shape 802 has a portion 802a within sub-ROI R3 (813) and a portion 802*b* within sub-ROI R2 (812), and the two portions 802*a*, 802*b* are divided by the line 805 on the shape 802 that corresponds to the boundary between sub-ROI R3 (813) and R2 (812). Then each sub-part of the neighboring shape 802 is smoothed according to the sub-region it belongs to; in this example the portion 802*a* within sub-ROI R3 (813) is smoothed according to the smoothing appropriate for sub-ROI R3 and the portion 802*b* within sub-ROI R2 (812) is smoothed according the smoothing appropriate for sub-ROI R2.

Figure 10:
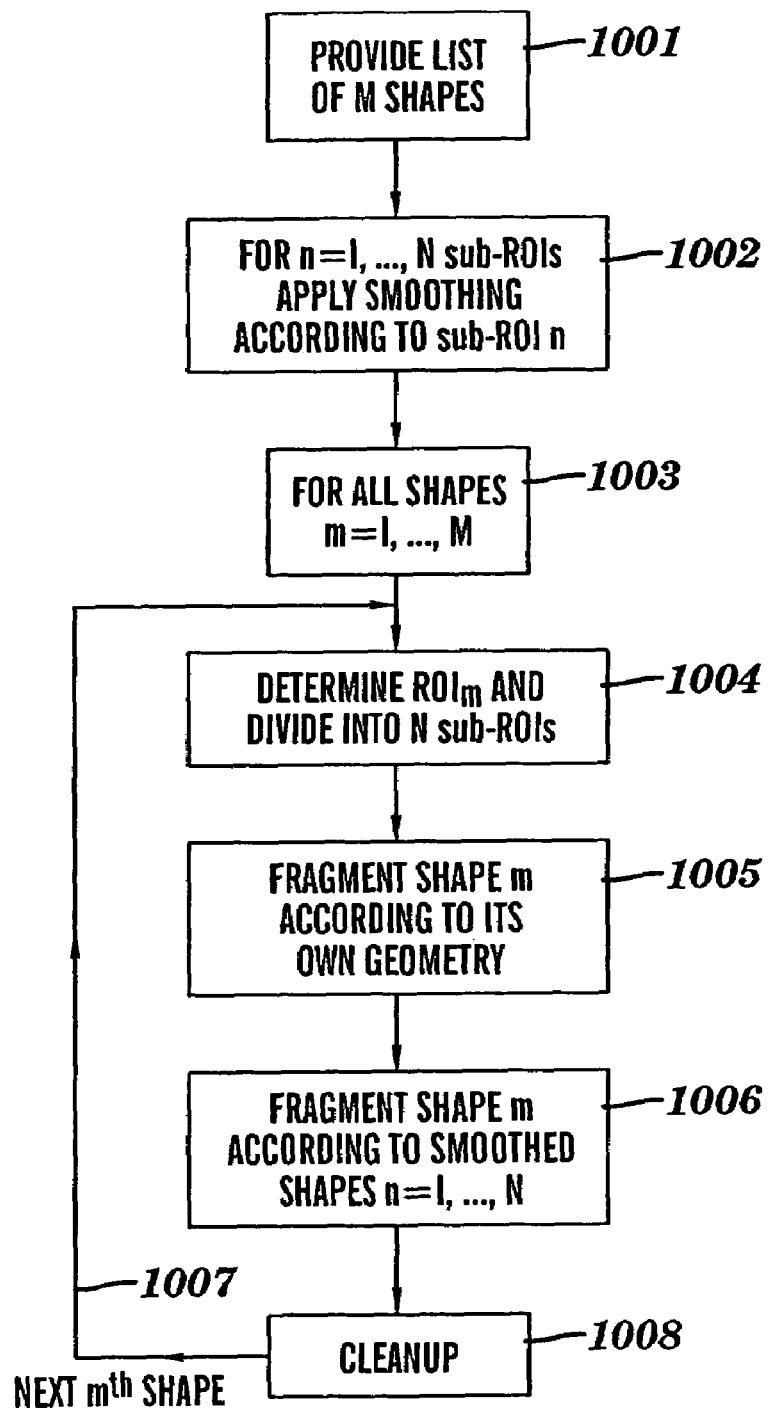
FIG. 10 illustrates a flow chart of the method according to one embodiment of the invention.

FIG. 10 illustrates a flow diagram of a preferred embodiment of the present invention. First, a mask layout is provided, having a list of M shapes (Block 1001). Then an amount or degree of smoothing for each of the sub-ROI's to be considered, for example, a smoothing of degree n=1, . . . , N, is applied to each of these M shapes, where N is the total number of sub-ROI's around each shape to be fragmented (Block 1002). The nth degree of smoothing refers to any amount of smoothing that increases as n, or as the effective influence of features within a sub-ROI on optical processing of the shape of interest m decreases, for example as the distance of a neighboring shape from the primary shape increases. The amount of increased smoothing of a neighboring shape as a function of distance from the primary shape can be any appropriate amount, and need not be limited to a fixed factor or monotonic increase of smoothing. A preferred value for N is 4, but other values may be appropriate depending on the trade-offs between shape influence and computation time. For example, where Manhattan shrink and grow operations are used for smoothing, sub-ROI regions R1, R2, R3 and R4 are assigned smoothing parameters $\alpha 1$, $\alpha 2$, $\alpha 3$, $\alpha 4$, respectively, where $0 \leq \alpha 1 < \alpha 2 < \alpha 3 < \alpha 4$. Preferably, no amount of smoothing is applied for degree n=1. The smoothed shapes are then preferably stored according to the "degree" of smoothing, which will correspond to a sub-ROI. Alternatively, the smoothed shapes may be determined during the fragmentation process as required.

For all of shapes, m=1, . . . , M (Block 1003), a main ROI around the mth shape is divided into N sub-ROI's (Block 1004). A preferred value for N is 4. Then, the initial fragmentation of the primary shape is performed according to the geometry of the primary shape itself (Block 1005). Next, within each nth sub-ROI, determine which neighboring shapes, or portions of neighboring shapes are within that nth sub-ROI. Then, using the stored smoothed shapes if available, or determined as needed, that have been smoothed by the nth amount of smoothing corresponding to the nth sub-ROI, the primary shape is fragmented in accordance with the nth smoothed shape (Block 1006). Then steps of Blocks 1004 through 1006 are repeated for the next mth primary shape until all shapes have been fragmented (Block 1007).

Finally, the fragmentations are cleaned up as necessary, according to mask manufacturability and process rules (Block 1008).

Many alternative embodiments of the invention are possible. First, it is not necessary that only geometric techniques such as the shrink and grow operations be applied to eliminate small features of the main mask shapes. Instead, mathematical techniques can be utilized to eliminate small features such as indentations and protrusions. Such techniques can be rule-based, e.g. such that the shape smoothing tool recognizes and eliminates such small features when traveling along the edges of features of the mask. Alternatively, smoothing may be performed in the spatial frequency domain, for example, by applying low-pass filtering.

Figure 16:
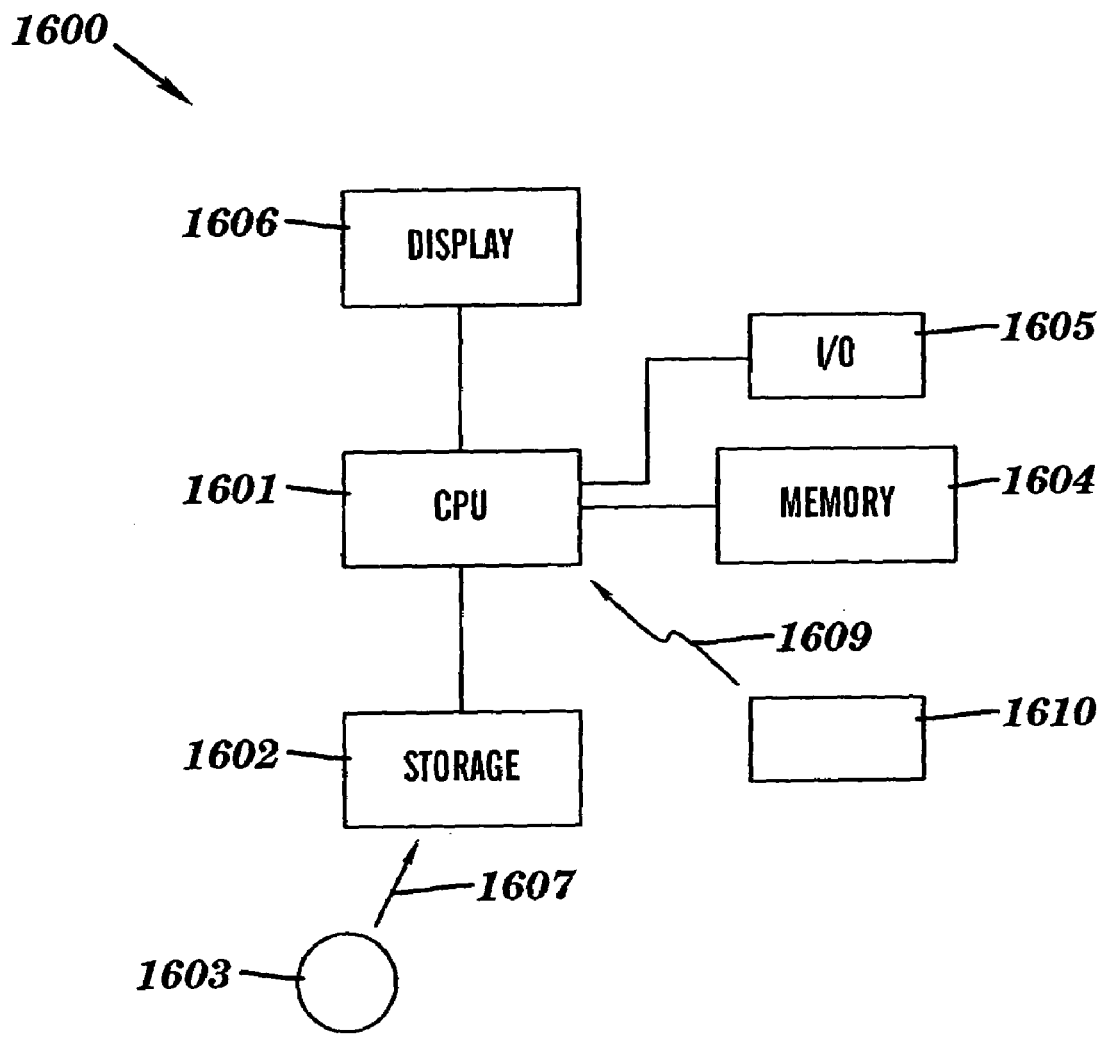
FIG. 16 illustrates a program product and computer system according to one embodiment of the invention.

Referring to FIG. 16, the method according to the invention may be adapted for implementation in a program product 1603 which may reside on a computer readable medium 1603 that comprises instructions for causing a computer or computer system 1600 to perform the method, or for assembling instructions for causing a computer 1600 to perform the method. The instructions may comprise any form presently known or developed in the future, to which a computer is responsive to, including, but not limited to, digital and/or analog machine language, compiled or interpretive languages, operating system instructions, or the like. The instructions for performing the method in program product 1603 may be used to assemble other instructions available from other media such as storage 1602, memory 1604, or other computer systems 1610 available over a communications connection 1609. FIG. 16 illustrates a computer system 1600 which may be adapted to perform the inventive method when provided with computer readable instructions for performing the method. The computer system 1600 comprises a CPU (central processing unit) 1601, storage devices or media 1602, memory 1604, and may include other input/output (I/O) devices 1605 or a display device 1606, and may additionally include other computer systems 1610 or devices 1603 which may be connected via a communications link (including, but not limited to, a wireless connection) 1609,1607, which may provide a portion of the instructions and/or may cooperate in performing the instructions.

While the invention has been described in accordance with certain preferred embodiments thereof, those skilled in the art will understand the many modifications and enhancements which can be made thereto without departing from the true scope and spirit of the invention, which is limited only by the claims appended below.

What is claimed is:

1. A method of performing optical proximity correction (OPC) comprising the steps of:
   identifying a feature of interest having edges to be fragmented;
   identifying one or more influencing features different from said feature of interest;
   smoothing said one or more influencing features to form smoothed influencing features smoothed edges, wherein an amount of smoothing of said one or more influencing features varies in accordance with the influence of said influencing feature on an image process of said feature of interest;
   defining fragments of edges of said feature of interest in accordance with said smoothed edges of said smoothed influencing features; and
   performing OPC of said feature of interest wherein said OPC comprises adjusting said fragments of edges of said feature of interest.

2. The method according to claim 1 wherein said identifying said one or more influencing features further comprises:
   identifying a plurality of regions of interaction (ROIs) around said feature of interest, so that each of said plurality of ROIs contains at least a portion of said one or more influencing features; and
   providing a smoothing parameter corresponding to each of said plurality of ROIs in accordance with an amount of influence of said at least a portion of said one or more influencing features on said image process of said feature of interest; and
   wherein said smoothing is performed on each of said at least a portion of said one or more influencing features within each of said plurality of ROIs in accordance with said corresponding smoothing parameter.

3. The method according to claim 2 wherein said smoothing is performed using Manhattan smoothing comprising the use of an ortho object having a smoothing dimension corresponding to each of said ROIs wherein each of said smoothing parameters increases in value in accordance with decreasing influence of said at least a portion of said one or more influencing features within said corresponding ROI.

4. The method according to claim 2 wherein said identifying a plurality of ROIs further comprises:
identifying a boundary of a primary region around said feature of interest so that features located outside the boundary of said primary region have a substantially insignificant influence on the image process of the feature of interest; and
dividing said primary region into sub-ROIs around said feature of interest.

5. The method according to claim 4 wherein said sub-ROIs are substantially homocentric with respect to each other.

6. The method according to claim 1 wherein said smoothing is performed using Manhattan smoothing.

7. The method according to claim 1 wherein said smoothing is performed using low-pass filtering in the spatial frequency domain.

8. A program product comprising a computer readable medium embodying instructions capable of causing a computer to perform the method steps of:
identifying a feature of interest having edges to be fragmented;
identifying one or more influencing features different from said feature of interest;
smoothing said one or more influencing features to form smoothed influencing features smoothed edges, wherein an amount of smoothing of said one or more influencing features varies in accordance with the influence of said influencing feature on an image process of said feature of interest;
defining fragments of edges of said feature of interest in accordance with said smoothed edges of said smoothed influencing features; and
performing OPC of said feature of interest wherein said OPC comprises adjusting said fragments of edges of said feature of interest.

9. The program product according to claim 8 wherein said identifying said one or more influencing features further comprises:
identifying a plurality of regions of interaction (ROIs) around said feature of interest, so that each of said plurality of ROIs contains at least a portion of said one or more influencing features; and
providing a smoothing parameter corresponding to each of said plurality of ROIs in accordance with an amount of influence of said at least a portion of said one or more influencing features on said image process of said feature of interest; and
wherein said smoothing is performed on each of said at least a portion of said one or more influencing features within each of said plurality of ROIs in accordance with said corresponding smoothing parameter.

10. The program product according to claim 9 wherein said smoothing is performed using Manhattan smoothing comprising the use of an ortho object having a smoothing dimension corresponding to each of said ROIs wherein each of said smoothing parameters increases in value in accordance with decreasing influence of said at least a portion of said one or more influencing features within said corresponding ROI.

11. The program product according to claim 9 wherein said identifying a plurality of ROIs further comprises:
identifying a boundary of a primary region around said feature of interest so that features located outside the boundary of said primary region have a substantially insignificant influence on the image process of the feature of interest; and
dividing said primary region into sub-ROIs around said feature of interest.

12. The program product according to claim 11 wherein said sub-ROIs are substantially homocentric with respect to each other.

13. The program product according to claim 8 wherein said smoothing is performed using Manhattan smoothing.

14. The program product according to claim 8 wherein said smoothing is performed using low-pass filtering in the spatial frequency domain.

15. A computer system comprising a computer readable medium embodying instructions capable of causing said computer system to perform the method steps of:
identifying a feature of interest having edges to be fragmented;
identifying one or more influencing features different from said feature of interest;
smoothing said one or more influencing features to form smoothed influencing features smoothed edges, wherein an amount of smoothing of said one or more influencing features varies in accordance with the influence of said influencing feature on an image process of said feature of interest;
defining fragments of edges of said feature of interest in accordance with said smoothed edges of said smoothed influencing features; and
performing OPC of said feature of interest wherein said OPC comprises adjusting said fragments of edges of said feature of interest.

16. The computer system according to claim 15 wherein said identifying said one or more influencing features further comprises:
identifying a plurality of regions of interaction (ROIs) around said feature of interest, so that each of said plurality of ROIs contains at least a portion of said one or more influencing features; and
providing a smoothing parameter corresponding to each of said plurality of ROIs in accordance with an amount of influence of said at least a portion of said one or more influencing features on said image process of said feature of interest; and
wherein said smoothing is performed on each of said at least a portion of said one or more influencing features within each of said plurality of ROIs in accordance with said corresponding smoothing parameter.

17. The computer system according to claim 16 wherein said smoothing is performed using Manhattan smoothing comprising the use of an ortho object having a smoothing dimension corresponding to each of said ROIs wherein each of said smoothing parameters increases in value in accordance with decreasing influence of said at least a portion of said one or more influencing features within said corresponding ROI.

18. The computer system according to claim 16 wherein said identifying a plurality of ROIs further comprises:
identifying a boundary of a primary region around said feature of interest so that features located outside the boundary of said primary region have a substantially insignificant influence on the image process of the feature of interest; and dividing said primary region into sub-ROIs around said feature of interest.

19. The computer system according to claim 18 wherein said sub-ROIs are substantially homocentric with respect to each other.

20. The computer system according to claim 15 wherein said smoothing is performed using Manhattan smoothing.

21. The computer system according to claim 15 wherein said smoothing is performed using low-pass filtering in the spatial frequency domain.

* * * * *